United States Patent
Alper et al.

(10) Patent No.: US 11,233,739 B2
(45) Date of Patent: Jan. 25, 2022

(54) LOAD BALANCING SYSTEM AND METHOD

(71) Applicant: Qwilt, Inc., Redwood City, CA (US)

(72) Inventors: Adan Alper, Hod-Hasharon (IL); Oren Shemesh, Moshav Moledet (IL)

(73) Assignee: Qwilt, Inc., Redwood City, CA (US)

(*) Notice: Subject to any disclaimer, the term of this patent is extended or adjusted under 35 U.S.C. 154(b) by 0 days.

(21) Appl. No.: 16/929,412

(22) Filed: Jul. 15, 2020

(65) Prior Publication Data

US 2021/0021524 A1 Jan. 21, 2021

Related U.S. Application Data

(60) Provisional application No. 62/874,136, filed on Jul. 15, 2019.

(51) Int. Cl.
*H04L 12/803* (2013.01)

(52) U.S. Cl.
CPC .................. *H04L 47/125* (2013.01)

(58) Field of Classification Search
CPC ....... H04L 47/125; H04L 9/06; H04L 9/3236; H04L 9/3239; H04L 29/08234; H04L 45/7453; H04L 67/1065
See application file for complete search history.

(56) References Cited

U.S. PATENT DOCUMENTS

| | | | |
|---|---|---|---|
| 9,571,570 B1 | 2/2017 | Mutnuru | |
| 2005/0022047 A1* | 1/2005 | Chandrasekaran | G06F 16/2343 714/5.11 |
| 2015/0169467 A1* | 6/2015 | Chase | G06F 16/9014 711/216 |
| 2017/0013508 A1* | 1/2017 | Pallas | H04W 76/12 |
| 2018/0375772 A1* | 12/2018 | Wickeraad | G06F 16/9014 |

* cited by examiner

*Primary Examiner* — Sm A Rahman
(74) *Attorney, Agent, or Firm* — M&B IP Analysts, LLC

(57) ABSTRACT

A system and method for load balancing using a rendezvous hashing load balancer. The method includes generating a lookup table, the lookup table having cells that define a row and a column, wherein each of the row of the lookup table corresponds to an index, and each of the column corresponding to an identifier of a resource of a plurality of resources towards which the load balancer provides access, generating, for each of the cells, a first hash result based on an index of the each of the cells, and a corresponding resource identifier, each of the corresponding resource identifier associated with a unique resource of the plurality of resources, sorting the column of the lookup table for each of the row, based on the first hash result, and storing the sorted lookup table in a memory of the load balancer.

20 Claims, 5 Drawing Sheets

LOAD BALANCING SYSTEM AND METHOD

CROSS-REFERENCE TO RELATED APPLICATIONS

This application claims the benefit of U.S. Provisional Application No. 62/874,136 filed on Jul. 15, 2019, the contents of which are hereby incorporated by reference.

TECHNICAL FIELD

The present disclosure relates generally to load balancing, and particularly to a system and method of utilizing rendezvous hashing in load balancing techniques.

BACKGROUND

Rendezvous hashing, also known as highest random weight hashing is a computer method that allows client devices to agree in a distributed manner on how to access resources. For example, rendezvous hashing can be used to decide where to store a block of data, out of a plurality of available storage devices, in a manner that each client which attempts to retrieve the block of data in the future would know which resource to access. Typical implementations of this algorithm require a lot of computational resources to decide on where to store large blocks of data per request for resource, which may require continued repopulation of databases that keep track of storage space allocation each time resource is allocated or removed, which drives up computational cost.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for load balancing using a rendezvous hashing load balancer. The method includes generating a lookup table, the lookup table having cells that define a row and a column. Each of the row of the lookup table corresponds to an index, and each of the column corresponding to an identifier of a resource of a plurality of resources towards which the load balancer provides access. The method also includes generating, for each of the cells, a first hash result based on an index of the each of the cells, and a corresponding resource identifier, each of the corresponding resource identifier associated with a unique resource of the plurality of resources, sorting the column of the lookup table for each of the row, based on the first hash result, and storing the sorted lookup table in a memory of the load balancer.

Certain embodiments disclosed herein also include a non-transitory computer readable medium having stored thereon causing a processing circuitry to execute a process, the process including generating a lookup table, the lookup table having cells that define a row and a column. Each of the row of the lookup table corresponds to an index, and each of the column corresponding to an identifier of a resource of a plurality of resources towards which the load balancer provides access. The method also includes generating, for each of the cells, a first hash result based on an index of the each of the cells, and a corresponding resource identifier, each of the corresponding resource identifier associated with a unique resource of the plurality of resources, sorting the column of the lookup table for each of the row, based on the first hash result, and storing the sorted lookup table in a memory of the load balancer.

Certain embodiments disclosed herein also include a system for load balancing using a rendezvous hashing load balancer. The system includes a processing circuitry; and a memory, the memory containing instructions that, when executed by the processing circuitry, configure the system to generate a lookup table, the lookup table having cells that define a row and a column. Each of the row of the lookup table corresponds to an index, and each of the column corresponding to an identifier of a resource of a plurality of resources towards which the load balancer provides access. The system is also configured to generate, for each of the cells, a first hash result based on an index of the each of the cells, and a corresponding resource identifier, each of the corresponding resource identifier associated with a unique resource of the plurality of resources, sort the column of the lookup table for each of the row, based on the first hash result, and store the sorted lookup table in a memory of the load balancer.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
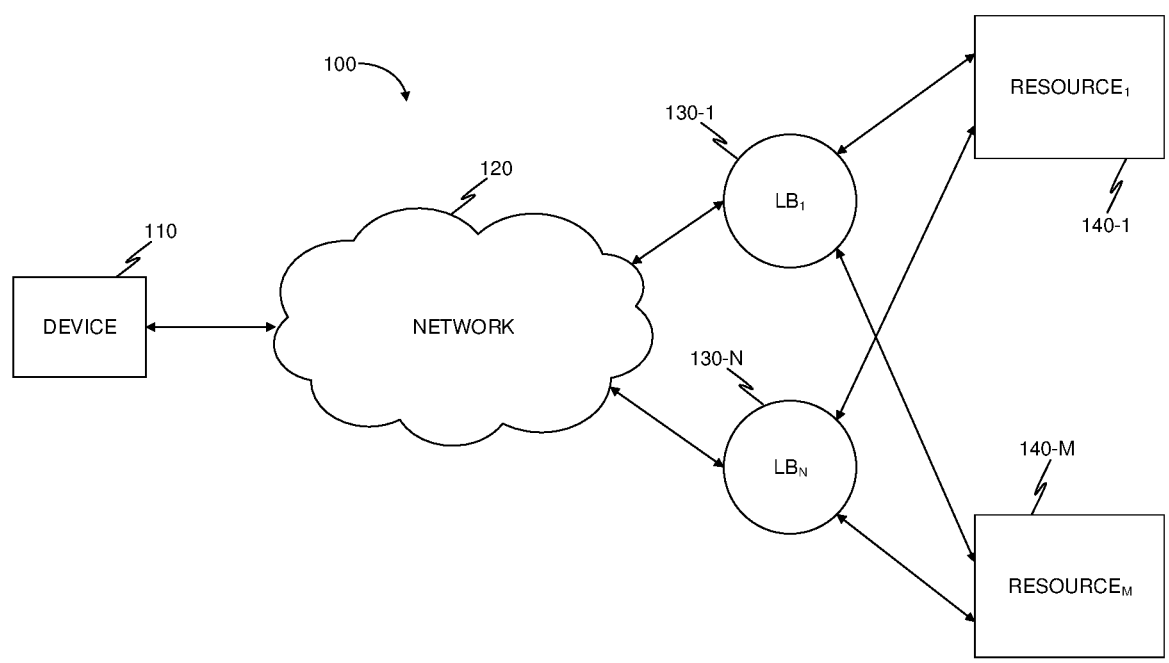
FIG. 1 is a schematic illustration of network accessible resources utilizing a load balancing system, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for load balancing using a rendezvous hashing load balancer. Rendezvous hashing is a computer algorithm that allows a set of clients to agree, in a distributed manner, which server resource of a group of resources should be accessed for storing and recovering data through a load balancing unit. A lookup table is generated by calculating a hash value for each of the resources together with an index value. The results are sorted so that the highest scoring resource for each row is displayed first, followed by the second highest scoring, etc. Thus, rather than computing the result each time a request to access a resource is received, the load balancer performs the initial calculation, stores a lookup table of the results, and performs a less resource-intense computation for each request.

FIG. 1 is a schematic illustration 100 of network accessible resources utilizing a load balancing system, implemented in accordance with an embodiment. A plurality of networked resources 140-1 through 140-M (hereinafter resource 140 or resources 140) are coupled with a load balancing system that includes, in an embodiment, a plurality of load balancers 130-1 through 130-N (hereinafter load balancer 130 or load balancers 130). The resources 140 may be, for example, network accessible storage (NAS) devices, web caches, data repositories, web servers, CDNs, and the like. The load balancing system is operative to ensure that no one resource is over-utilized relative to the others.

The load balancers 130 are coupled with a network 120. In an embodiment, the network 120 may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity. The network is further coupled with one or more devices, such as a user device 110. The user device 110 may be a computer device such as a laptop, personal computer, server, etc., or a mobile computer device, such as a smartphone, tablet, and the like.

When the device 110 attempts to request access to a resource 140, a request is sent over the network 120 and received by the load balancing system (i.e. one or more of the load balancers 130). The load balancing system is operative to transfer the request to one or more of the resources 140, in order to provide service to the device 110. In this embodiment 'M' and 'N' have integer values, where 'N' has a value of '1' or greater, and 'M' has a value of '2' or greater.

Figure 2:
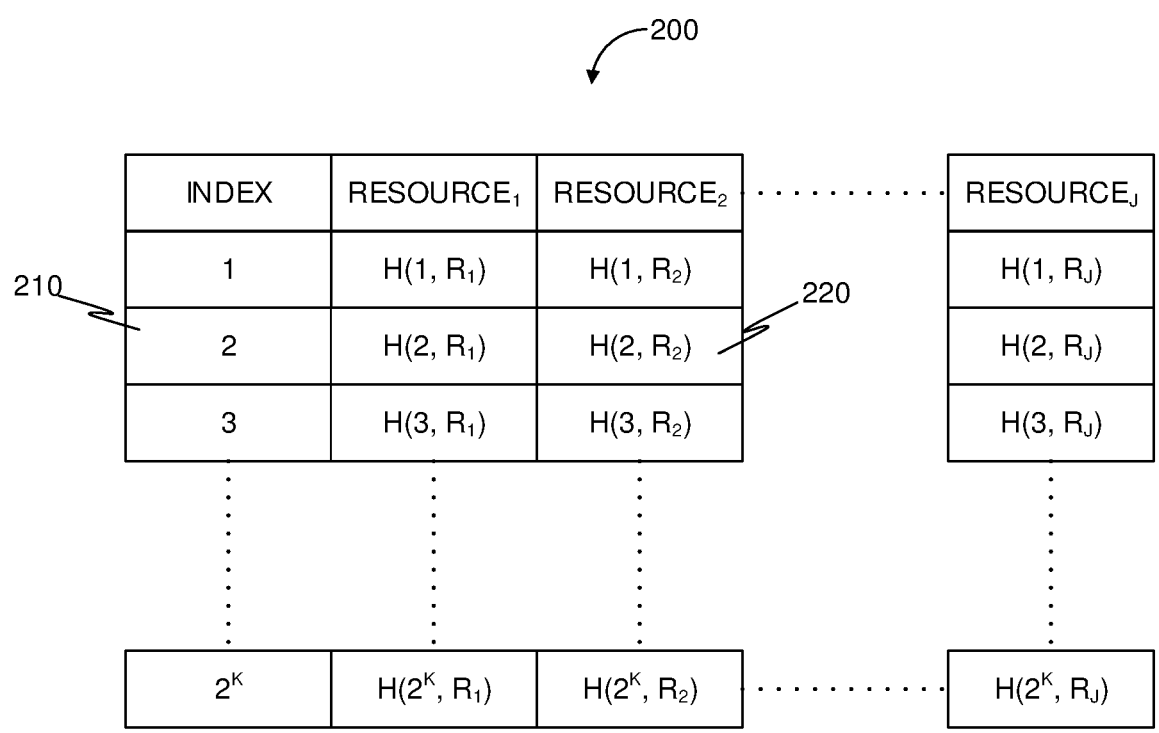
FIG. 2 is a schematic illustration of a resource lookup hash table, implemented in accordance with an embodiment.

FIG. 2 is a schematic illustration of a resource lookup hash table 200, implemented in accordance with an embodiment. A resource lookup hash table includes a column for each resource 140, and an identifier column. The identifier column may be an index identifying the row, such as index 210, or other unique identifier corresponding to the size of the hash table. Each resource 140 is allocated a column, so there are 'J'+1 columns, which correspond to 'J' resources 140. In this example, the hash table is of size 2K, where 'K' is an integer having a value of '1' or greater, but typically having a value of '6' or greater. For each cell in the lookup table (i.e. intersection of a resource column and row), a hash function H result is stored. The hash function H result is based on the row identifier (which corresponds to the size of the hash table, in this case the index number) and a resource identifier, and has a size or space that maps every possible value into a limited space size. Generally, the larger the space of the hash function, the more unique values the hash function can map to.

For example, cell 220 contains therein a result of applying the hash function using index row '2' and Resource2 identifier 'R2' as inputs, the result being H(2, R2). In this manner, when a request is received from a device, such as device 110, an identifier, such as device identifier, may be used as an input for a second hash function G that may be executed on a load balancing module, and whose output is uniformly distributed among the possible values of the row identifier and has a similar size and space as the first hash function H.

In certain embodiments, H and G may be the same function. However, as H requires two inputs, and G requires a single input, using the same function for H and G may necessitate providing G with an identifier (real input) and a second input, which is a dummy input. The dummy input may be the identifier, a fixed input, and the like. In such embodiments G may be a degenerate function of H.

In some embodiments, a device identifier may be a MAC address, IP address, device name, etc. In certain embodiments a data identifier may be used. For example, if a client device wants to store (or retrieve) content having a unique content ID, the content ID may be used as the input for the hash function. By doing so, the content can be retrieved by any device having the content ID, since the device only needs to know the content ID, and not on which exact server the content was stored. The output of hash function G is the row identifier in the lookup table 200. From the lookup table a resource list (or pairing, in an embodiment) may be generated for each index, by sorting the hash result.

For example, an index row may be sorted in descending order of hash result, with each corresponding resource. In this example, index '2' 210 is paired with H(2, R2) which has the highest hash result. In some embodiments, a row of the hash values may be sorted, and stored (either storing the entire sorted row, or a part thereof) so that if the first resource on the list is unavailable, the client device is directed to the next resource on the list, and so on.

By precomputing the hash table 200, computational resources are conserved when determining what resource to match or connect with the device. Computational resources are conserved especially when compared to devices that generate, for each request, a hash with each resource being connected with the device to determine which resource should be allocated to handle the request, every time a request is received. In an embodiment, the hash table may be stored on each load balancer of the load balancing system.

It should be noted that adding or removing resources, or enlarging the hash space, do not require repopulation of the entire table, both of which reduce computational cost. In some embodiments, virtual identifiers may be used for the resources, and the virtual identifiers are used to populate the lookup table. Assigning virtual identifiers to resources 140 may allow, for example, setting weights to resources 140, by assigning more than one virtual identifier to a single resource 140. Thus, a resource 140 which has a higher capacity will be assigned more virtual identifiers than a resource 140 having a lower capacity, which would ensure that the higher capacity resource 140 would handle a number of requests which is proportionate to its capability, rather than underutilizing the resource 140 by allocating requests as if every resource 140 were similar in capacity.

Figure 3:
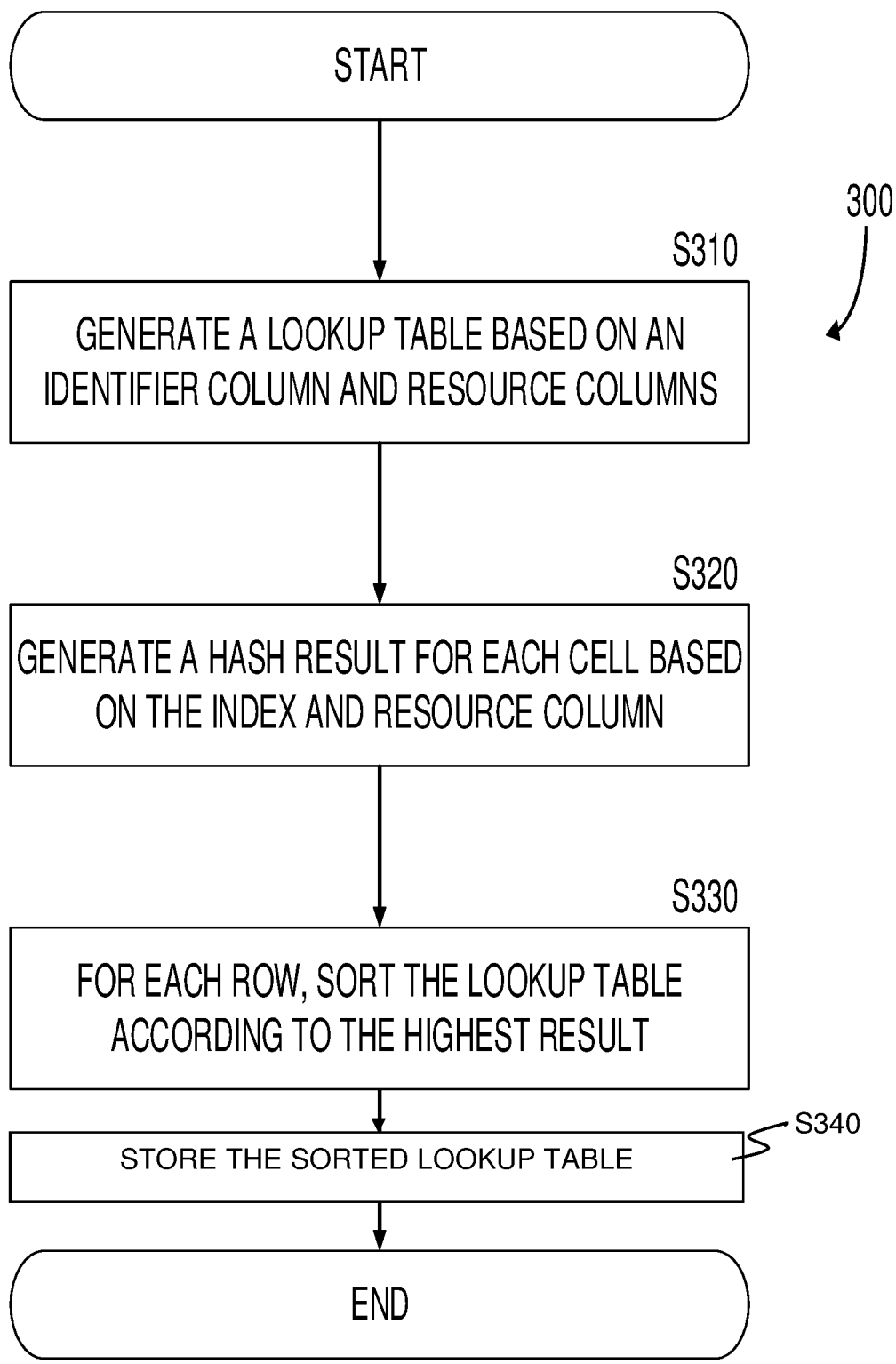
FIG. 3 is a flowchart of a method for generating a resource lookup hash table, implemented in accordance with an embodiment.

FIG. 3 is a flowchart 300 of a method for generating a resource lookup hash table, implemented in accordance with an embodiment. At S310 a lookup table is generated, based on an identifier column, and a plurality of columns each corresponding to a networked computational resource.

At S320 the lookup table is populated, by applying for each cell a hash function which has as an input an identifier from the identifier column, and a resource identifier of a networked computational resource which corresponds to the column of the cell. In the above example of FIG. 2, cell 220 contains therein a result of applying the hash function using index row '2' and Resource2 identifier 'R2' as inputs, the result being H(2, R2). A resource identifier may be a network address, virtual address, MAC address, name selected from a namespace, TCP/IP address, and the like. In some embodiments a weight may be assigned to each resource to increase or decrease the probability a device will be connected to that resource. This may be especially beneficial where resources have equal functionality but unequal capability.

For example, two processors may have identical functions (data processing) but a first of the two processors may have more computational cores than a second of the two processors, and can therefore provide more capacity. The same may be applied to storage, networking bandwidth, memory, etc. In some embodiments, a resource may have one or more identifiers (i.e. virtual identifiers). In such an embodiment, certain resources may be given more weight (i.e. be assigned more virtual identifiers), so that they will store more information, handle more requests, etc. than other similar resources.

At S330 each row of the lookup table is sorted for each entry within the row that defines one of the plurality of columns according to the highest value. For example, for index '2' 210 shown in FIG. 2, the calculated value of H(2, R2) may be the highest, followed by the calculated value of H(2, R1), and finally, H(2, RJ).

At S340, the sorted lookup table is stored in a memory of a load balancer.

Figure 4:
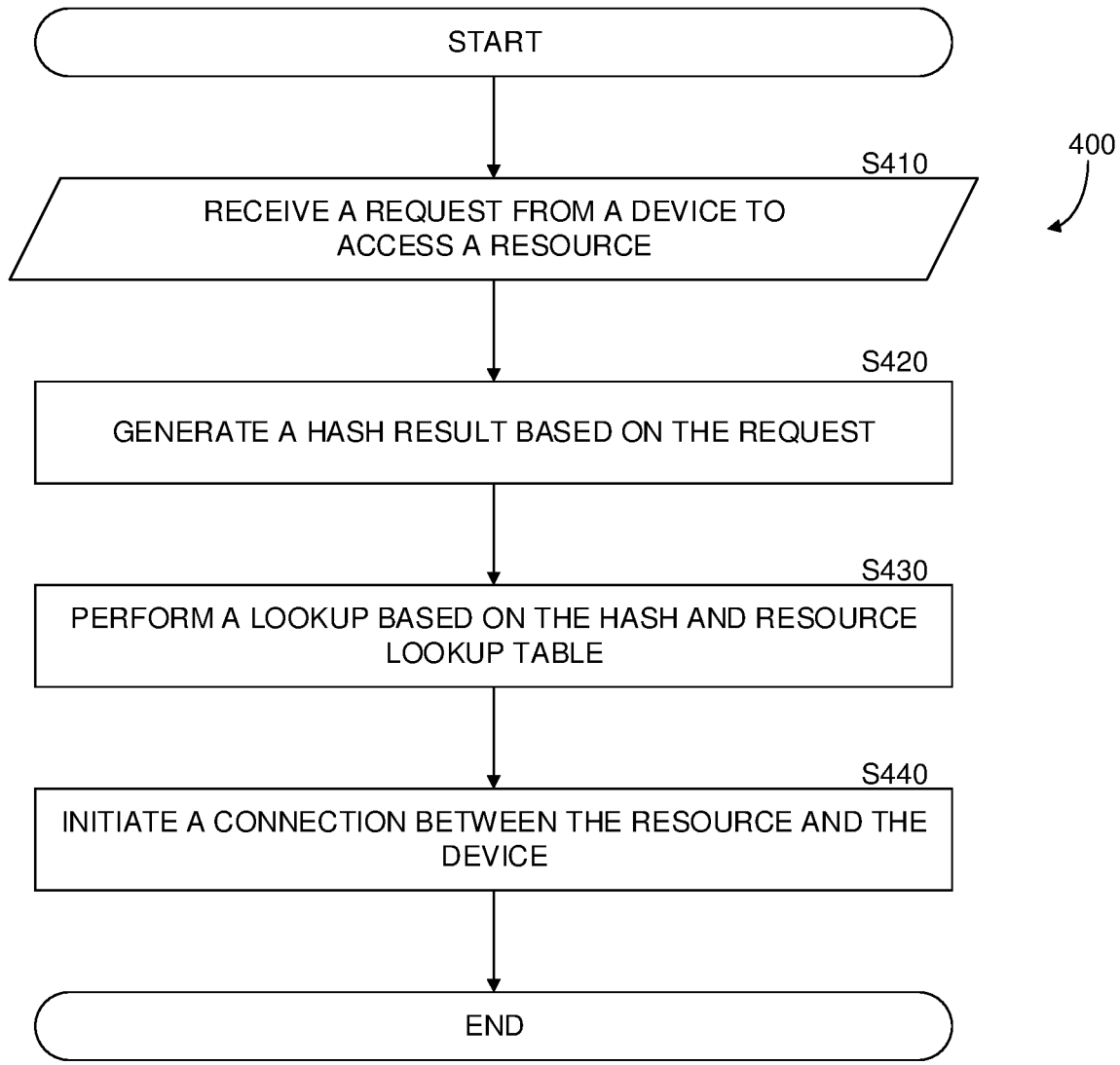
FIG. 4—is a flowchart of a method for accessing a networked resource using a load balancing scheme employing a lookup hash table, implemented in accordance with an embodiment.

FIG. 4 is a flowchart 400 of a method for accessing a networked resource using a load balancing scheme employing a lookup hash table, implemented in accordance with an embodiment.

At S410 a request is received from a device, such as device 110 of FIG. 1 above, to access a networked resource. The networked resource may be for example, network accessible storage (NAS) devices, web caches, data repositories, web servers, CDNs, and the like. In an embodiment, the device may be a computing device, such as a PC, server, or laptop, or mobile computing device such as a smartphone or tablet.

At S420 a hash result is generated based on the request. The hash result may be generated by supplying to a hash function as an input at least an identifier of the device, such as MAC address, IP address, and the like. In other embodiments, the input may be an identifier of data, such as address, content ID, and the like.

At S430 a lookup is performed to determine which resource is to be allocated to the device. The lookup may be performed by accessing the sorted table (or list, or pairing), and selecting the resource that is first in the sorted table based on the hash result. In embodiments where a list of resources is available, if the first resource is unavailable, the next resource in the list may be selected, etc.

At S440 a connection is initiated between the resource and the device. Connection may be initiated, for example, by delivering a request from the load balancing system to the resource, or by instructing the client to connect or communicate with a resource at a certain specific network address.

Figure 5:
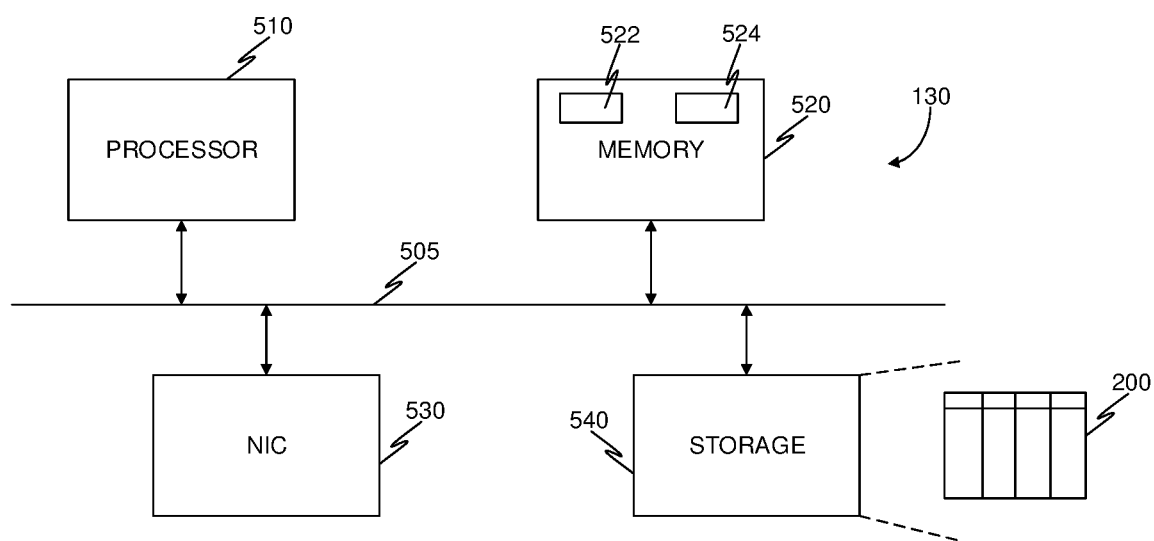
FIG. 5—is a schematic illustration of a load balancer system implemented according to an embodiment.

FIG. 5 is a schematic illustration of a load balancer system 130 implemented according to an embodiment. The system 130 includes at least one processor 510, for example, a central processing unit (CPU). In an embodiment, the processor 510 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing element 510 is coupled via a bus 505 to a memory 520. The memory 520 may include a memory portion 522 that contains instructions that when executed by the processor 510 performs the method described in more detail herein. The memory 520 may be further used as a working scratch pad for the processor 510, a temporary storage, and others, as the case may be. The memory 520 may be a volatile memory such as, but not limited to random access memory (RAM), or non-volatile memory (NVM), such as, but not limited to, Flash memory. Memory 520 may further include memory portion 524 containing one or more requests for accessing resources coupled with the system 130, the requests received from client devices, such as device 110. In an embodiment the one or more requests may be stored in a queue in the memory portion 524.

The processor 510 may be coupled to a network interface controller (NIC) 530, which provides network connectivity to the load balancer system 130. The NIC 530 may provide an interface to connect with one or more client devices, an interface for connecting with one or more networked resources, and the like. The processor may be further coupled with a persistent storage device, such as storage 540. The storage device 540 may contain therein a resource lookup hash table 200, such as explained in more detail with respect to FIG. 2 above. The storage device 540 may also be used for the purpose of holding a copy of the method executed in accordance with the disclosed technique. The processor 510 and/or the memory 520 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for load balancing using a rendezvous hashing load balancer, the method comprising:
   generating a lookup table, the lookup table being arranged as a two-dimensional array of cells, wherein each row of cells of the lookup table corresponds to an index and each column of cells of the lookup table corresponds to a respective identifier that indicates a resource of a plurality of resources to which the load balancer provides access;
   generating, as a value for each respective one of the cells, a first hash result based on each cell's index and its corresponding resource identifier and
   storing the lookup table in a memory of the load balancer.

2. The method of claim 1, further comprising:
   receiving, at the load balancer, a request from a client device to access a resource;
   generating a second hash result based on the request;
   performing a lookup of the generated second hash result in the stored lookup table to determine which of the plurality of resources to provide; and
   providing access for the client device request to a specific resource from the plurality of resources based on the result of the performed lookup.

3. The method of claim 2, wherein the second hash result is further generated based on one of a content identifier, a MAC address, an IP address, or a block.

4. The method of claim 2, further comprising:
   determining whether a first resource in the sorted lookup table is available for executing the client request; and
   providing access for the client device request to a second resource from the sorted lookup table, upon determining that the first resource is unavailable for executing the client request.

5. The method of claim 2, wherein:
   the first hash result is generated using a first hash function;
   the second hash result is generated using a second hash function; and
   the first hash function and the second hash function cover a space substantially corresponding to a size of the lookup table.

6. The method of claim 1, wherein the resource identifier is one of a name from a namespace, a network address, or a MAC address.

7. The method of claim 1, wherein at least two of the identifiers indicate the same resource of the plurality of resources.

8. The method of claim 1, wherein the resource of the plurality of resources includes one of a network accessible storage device, a web cache, a data repository, a web server, or a content delivery network component.

9. A non-transitory computer readable medium having stored thereon instructions for causing a processing circuitry to execute a process, the process comprising:
   generating a lookup table, the lookup table being arranged as a two-dimensional array of cells, wherein each row of cells of the lookup table corresponds to an index and each column of cells of the lookup table corresponds to a respective identifier that indicates a resource of a plurality of resources to which the load balancer provides access;
   generating, as a value for each respective one of the cells, a first hash result based on each cell's index and its corresponding resource identifier; and
   storing the lookup table in a memory of the load balancer.

10. A system for load balancing using a rendezvous hashing load balancer, comprising:
    a processing circuitry; and
    a memory, the memory containing instructions that, when executed by the processing circuitry, configure the system to:
    generate a lookup table, the lookup table being arranged as a two-dimensional array of cells, wherein each row of cells of the lookup table corresponds to an index and each column of cells of the lookup table corresponds to a respective identifier that indicates a resource of a plurality of resources to which the load balancer provides access;
    generate, as a value for each respective one of the cells, a first hash result based on each cell's index and its corresponding resource identifier; and
    store the lookup table in a memory of the load balancer.

11. The system of claim 10, wherein the system is further configured to:
    receiving, at the load balancer, a request from a client device to access a resource;
    generate a second hash result based on the request;
    perform a lookup of the generated second hash result in the stored lookup table to determine which of the plurality of resources to provide; and
    provide access for the client device request to a specific resource from the plurality of resources based on the result of the performed lookup.

12. The system of claim 11, wherein the second hash result is further generated based on one of a content identifier, a MAC address, an IP address, or a block.

13. The system of claim 11, wherein the system is further configured to:
   determine whether a first resource in the sorted lookup table is available for executing the client request; and
   provide access for the client device request to a second resource from the sorted lookup table, upon determining that the first resource is unavailable for executing the client request.

14. The method of claim 11, wherein:
   the first hash result is generated using a first hash function;
   the second hash result is generated using a second hash function; and
   the first hash function and the second hash function cover a space substantially corresponding to a size of the lookup table.

15. The system of claim 10, wherein the resource identifier is one of a name from a namespace, a network address, or a MAC address.

16. The system of claim 10, wherein at least two of the identifiers indicate the same resource of the plurality of resources.

17. The system of claim 10, wherein the resource of the plurality of resources includes one of a network accessible storage device, a web cache, a data repository, a web server, or a content delivery network component.

18. The method of claim 1, wherein each cell further includes an indication of the respective identifier of the column of the array in which it is initially located, the method further comprising:
   sorting the cells of each respective row of the lookup table based on the first hash result prior to storing the lookup table.

19. The non-transitory computer readable medium of claim 9, wherein each cell further includes an indication of the respective identifier of the column of the array in which it is initially located and wherein the process further comprises:
   sorting the cells of each respective row of the lookup table based on the first hash result prior to storing the lookup table.

20. The system of claim 10, wherein each cell further includes an indication of the respective identifier of the column of the array in which it is initially located and wherein the system is further configured to:
   sort the cells of each respective row of the lookup table based on the first hash result prior to the lookup table being stored.

* * * * *